(No Model.)
J. W. JOHNSON.
SIFTER.
No. 573,272. Patented Dec. 15, 1896.
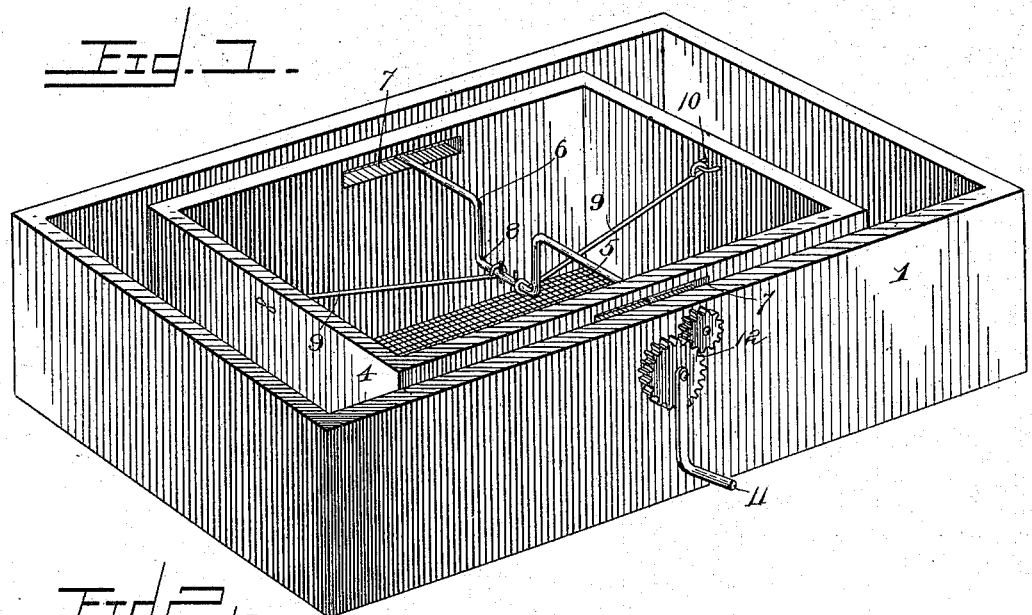
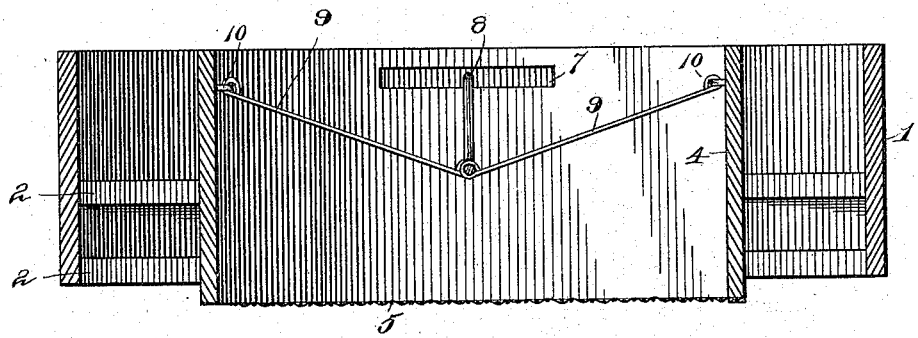
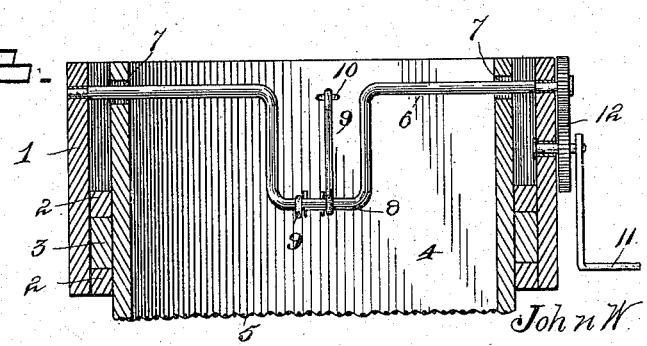
Inventor
John W. Johnson.
Witnesses
By his Attorneys,

UNITED STATES PATENT OFFICE.

JOHN W. JOHNSON, OF SHEFFIELD, ALABAMA.

SIFTER.

SPECIFICATION forming part of Letters Patent No. 573,272, dated December 15, 1896.

Application filed June 23, 1896. Serial No. 596,609. (No model.)

*To all whom it may concern:*

Be it known that I, JOHN W. JOHNSON, a citizen of the United States, residing at Sheffield, in the county of Colbert and State of Alabama, have invented a new and useful Sifter, of which the following is a specification.

My invention relates to a sifting device adapted especially for flour and meal and constructed to remove dirt and impurities without crushing lumps or forcing undesirable substances through the screen, as when an agitator is employed to traverse the surface thereof.

Further objects and advantages of this invention will appear in the following description, and the novel features thereof will be particularly pointed out in the appended claim.

In the drawings, Figure 1 is a perspective view of a sifting device constructed in accordance with my invention. Fig. 2 is a longitudinal central section of the same. Fig. 3 is a transverse section.

Similar numerals of reference indicate corresponding parts in all the figures of the drawings.

1 designates a casing open at the top and bottom and provided in its sides with horizontal guide-grooves 2, in which are fitted guide-ribs 3 on the parallel sides of the reciprocatory sieve 4, which is mounted within the casing or guide-frame. The sieve consists of side and end walls and is closed at its bottom by wire-cloth 5 or equivalent reticulated material.

6 represents a crank-shaft arranged transversely and mounted in bearings in the side walls of the casing or frame 1, the side walls of the sieve being longitudinally slotted, as shown at 7, to allow freedom of movement of the sieve. The crank 8, at the center of said shaft, is connected, by means of oppositely-extending pitmen 9, with the end walls of the sieve, said pitmen being loosely connected to the end walls by means of interlocking eyes 10. In practice I prefer to drive the crank-shaft by means of a crank 11, connected by multiplying-gearing 12 with the crank-shaft, as shown in the drawings, but it will be understood that the operating-crank may be attached directly to the crank-shaft.

It will be seen that the rotation of the crank-shaft causes reciprocatory movement of the sieve at any desired speed, and the flour, meal, or other substance is sifted by vibration instead of rubbing or agitation, as in devices heretofore employed for this purpose, the objection to agitating or rubbing the material residing in the fact that lumps of moldy meal or other substances which can be crushed and forced through the meshes of the screen are liable to be introduced into the sifted material to the detriment of the product.

The duplicate arrangement of the pitmen operated by a common crank-shaft and connected, respectively, to the opposite end walls of the sieve provides for the communication of motion to the sieve by tensile strain only upon the pitmen. Hence the pitmen may be constructed of light wire unable to resist strain applied in the opposite direction, and hence offering but slight obstruction to the introduction of material into the sieve.

Various changes in the form, proportion, and the minor details of construction may be resorted to without departing from the spirit or sacrificing any of the advantages of this invention.

Having described my invention, what I claim is—

A sifting device having a parallel-sided guide-frame, a sieve fitting and mounted within the guide-frame and provided in its side walls with longitudinal slots, a crank-shaft mounted in bearings in the side walls of the guide-frame and extending through said slots in the side walls of the sieve, said crank-shaft having its crank located between the side walls of the sieve, duplicate pitmen connecting said crank with the opposite end walls respectively of the sieve, whereby motion is communicated to the sieve by tensile strain applied alternately to the pitmen and means for communicating rotary motion to the crank-shaft including an operating crank-arm and speed-multiplying gearing, substantially as specified.

In testimony that I claim the foregoing as my own I have hereto affixed my signature in the presence of two witnesses.

JOHN W. JOHNSON.

Witnesses:
E. M. RAGLAND,
E. B. AUTREY.